Dec. 6, 1966 H. B. MOORE ETAL 3,290,045

DUST REMOVER FOR PHONOGRAPHS

Original Filed June 12, 1961 2 Sheets-Sheet 1

INVENTORS:
HARWOOD B. MOORE,
JOHN A. STEIN,

BY Norman C. Fulmer
THEIR ATTORNEY.

DUST REMOVER FOR PHONOGRAPHS

Original Filed June 12, 1961 2 Sheets-Sheet 2

INVENTORS:
HARWOOD B. MOORE,
JOHN A. STEIN,

BY Norman C. Fulmer

THEIR ATTORNEY.

3,290,045
Patented Dec. 6, 1966

3,290,045

DUST REMOVER FOR PHONOGRAPHS

Harwood B. Moore, Sauquoit, N.Y., and John A. Stein, Decatur, Ill., assignors to General Electric Company, a corporation of New York Continuation of application Ser. No. 116,327, June 12, 1961. This application July 26, 1965, Ser. No. 477,642
3 Claims. (Cl. 274—47)

The present invention is a continuation of my copending application Serial No. 116,327, filed June 12, 1961 for Dust Remover for Phonographs and now abandoned.

This invention relates to devices for removing dust from phonograph records, and particularly to an arrangement for removing dust from the surface of a phonograph record in the region of the reproducing needle while the record is being played.

Dust in the grooves of phonograph records is a major cause of record wear, and of needle wear, in addition to causing an annoying background noise while records are played. For many years attempts have been made to satisfactorily remove the dust from phonograph record grooves. It has previously been known to apply an air blast at the surface of a rotating phonograph record near the playback needle, while the record is being played, in order to blow dust away from the record groove near the needle. It also has been known, when cutting records, to blow or suck air at the surface of the record blank near the recording stylus in order to remove chips of material that have been cut from the record blank by the recording stylus.

The previously known technique of blowing air at a phonograph record to remove dust while playing it, has not generally been commercially successful, probably due to an annoying hissing noise caused by the amount of air blast required, and furthermore this technique is not fully effective because it does not remove dust from the record, but merely redistributes it so that a record after thus being played contains as much dust as before playing and hence the record grooves continue to contain dust at each playing. The known technique of applying a vacuum to the surface of a record blank during the cutting process has not been successfully applied commercially to playback phonographs, probably due to the need for suppling a container for, or otherwise disposing of, the cutting chips when thus removed from a record blank.

Accordingly, an object of the present invention is to increase the life of phonograph records and playback needles.

Another object of our invention is to provide a system for removing dust from phonograph records while the records are being played.

A further object of this invention is to provide an improved phonograph with means for removing dust from phonograph records while the records are being played.

An additional object of the present invention is to provide an improved vacuum nozzle for phonographs.

Still further objects of our invention will be apparent from the following description and claims, and from the accompanying drawings in which:

The invention basically comprises apparatus for applying a vacuum at a phonograph record in the region of the playing needle, and further comprises means for discharging the vacuum within the phonograph housing. Still further, the invention comprises an acoustical housing placed over the vacuum motor, for acoustically shielding the motor. The invention additionally comprises improved vacuum nozzle arrangements.

Figure 1:
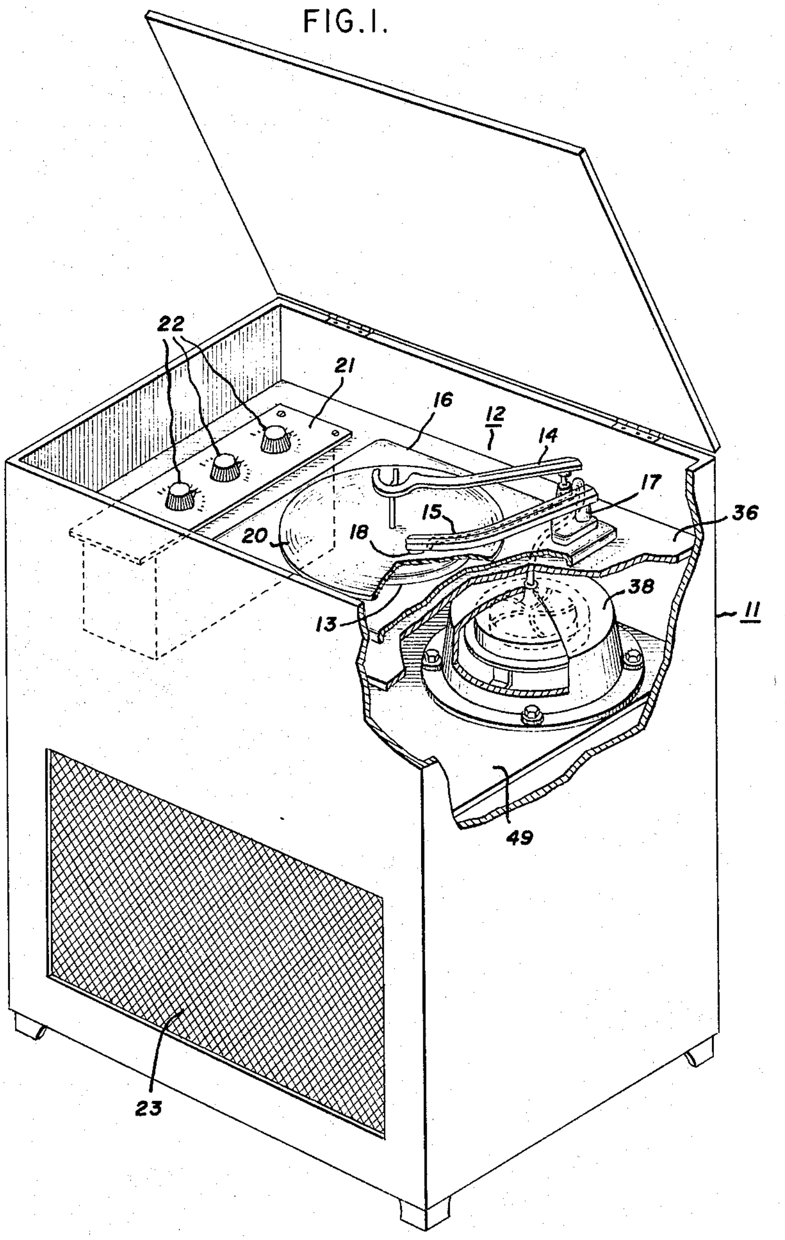
FIG. 1 is a perspective view of an improved phonograph equipped with a preferred embodiment of the invention, the phonograph cabinet being partially broken away to reveal interior detail.
Figure 2:
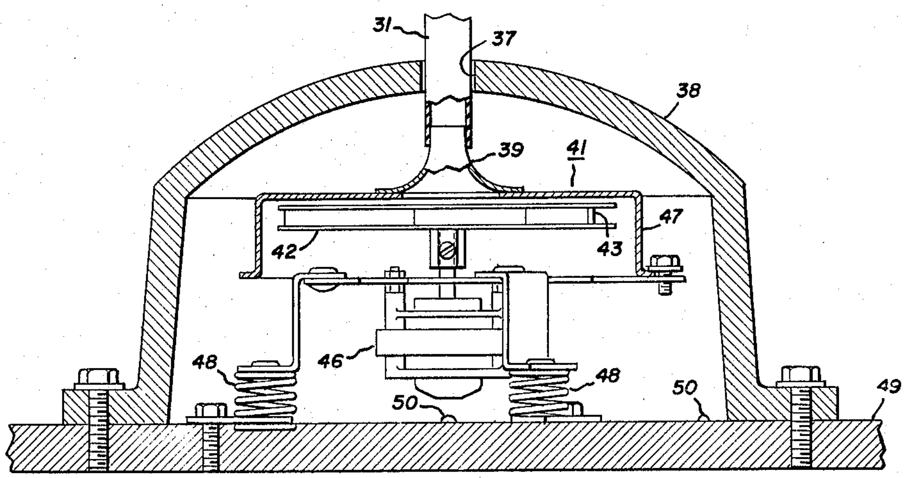
FIG. 2 is an enlarged cross-sectional view of the vacuum pump and acoustical housing of the preferred embodiment of the invention shown in FIG. 1.

Now referring to FIG. 1 of the drawing, the preferred embodiment of the invention comprises a phonograph having a cabinet or housing 11 containing a record playing apparatus 12 consisting of a rotatable turntable 13, a stabilizer arm 14 for stabilizing a stack of records to be played on the turntable 13, and a tone arm 15 pivotally attached at the rear end thereof to the record player frame 16 in known manner as indicated at 17, and having a pickup cartridge 18 at the forward end thereof equipped with a needle or stylus 19 (FIG. 3) for engaging the groove of a phonograph record 20 in a well-known manner. The cabinet 11 contains the usual amplifier apparatus 21 with control knobs 22, and a loudspeaker as indicated at 23. Lead wires 24 (FIG. 3) are connected between the cartridge 18 and the amplifier apparatus 21.

Figures 3, 4, 5, 6:
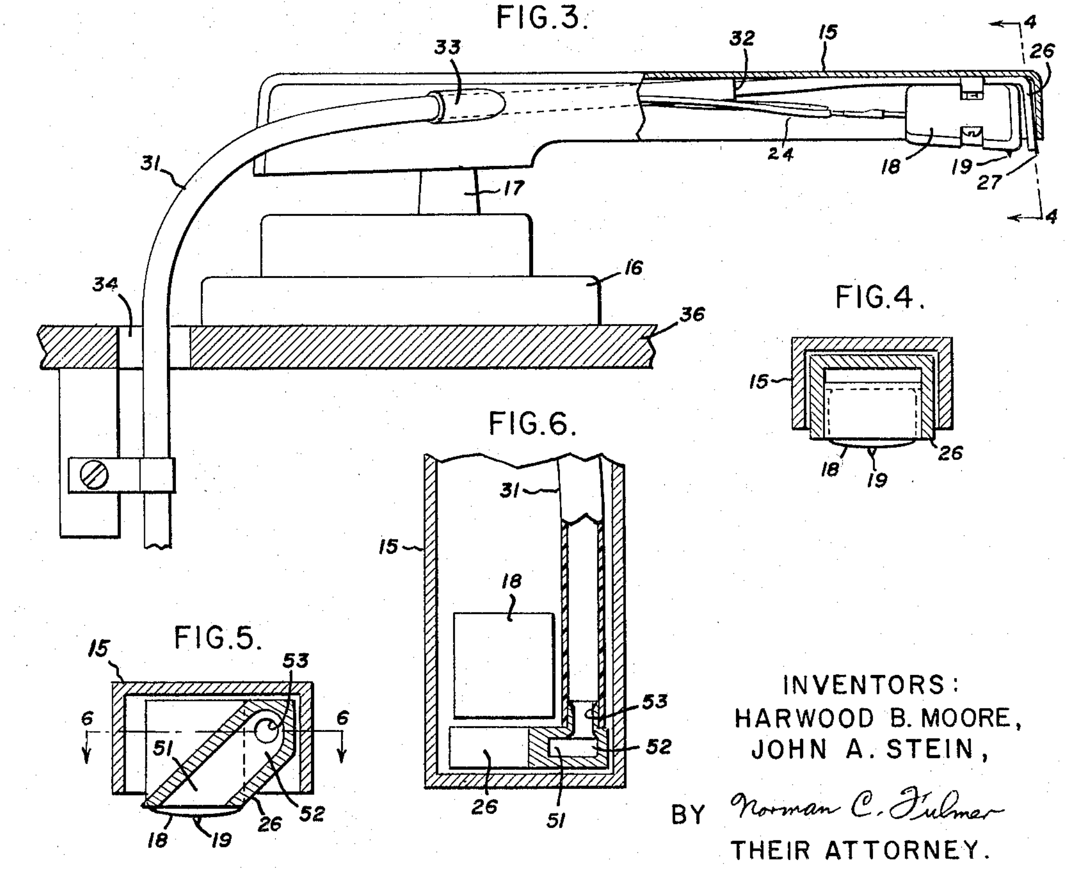
FIG. 3 is an enlarged side view of the phonograph tone arm, partially broken away to reveal interior constructional details, of the preferred embodiment of the invention shown in FIG. 1.
FIG. 4 is a cross-sectional view taken generally on the line 4—4 of FIG. 3.
FIG. 5 is a cross-sectional view, taken at the same place at FIG. 4, but showing an alternative construction.
FIG. 6 is a cross-sectional view taken on the line 6—6 of FIG. 5.

In accordance with the invention, and as most readily shown in FIG. 3, the tone arm 15 is provided with a vacuum nozzle 26 in the vicinity of the needle 19. The nozzle 26 preferably is formed from plastic or metal having a hollow cross-sectional shape as shown in FIG. 4, and is shaped to fit within the tone arm 15 over the cartridge 18, and extends downwardly in front of the cartridge and terminates in the vicinity of the needle 19. If desired, the nozzle 26 may be formed integrally with the tone arm 12. The end of the nozzle near the needle preferably should be about one-sixteenth of an inch above the surface of a record being played. A brush 27 is attached to the nozzle 26 to loosen dust from the grooves of a record being played. A flexible hose 31, which may be made from rubber, plastic, or other flexible material, is attached to the rear end of the nozzle 26, as indicated at 32, and passes through the wall of the tone arm 15 at an appropriate point as indicated at 33, and extends downwardly through an opening 34 in the shelf 36 of the cabinet 11.

The hose 31 extends through an opening 37 in the top of an acoustical housing 38, and is attached to the inlet 39 of a vacuum pump 41. The acoustical housing 38 may be formed from paper maché, plastic, or other suitable material capable of absorbing sound. The vacuum pump 41 preferably contains a rotatable impeller 42 having a hollow center and provided with radially oriented vanes 43 which, when the impeller 42 is rotated, serve to cause air to flow from the center of the impeller to the periphery thereof. The inlet 39 of the vacuum motor is located over the center of the impeller 42, so that the impeller 42, when rotating, pulls air from the hose 31 into the inlet 39, thus creating a vacuum at the end of the vacuum nozzle 26 in the vicinity of the needle 19.

The impeller 42 is rotated by means of a motor 46, which may be separate from the motor driving the turntable 13, or may, if desired, be the same motor that drives the turntable 13, provided that the rotating mechanism is suitably balanced to prevent adverse acoustical effects. A bracket 47 supports the inlet 39. If desired, the bracket may consist of a circular housing having an open bottom and positioned over the impeller 42. Any dust sucked from a phonograph record will settle downwardly from the impeller 42. The bracket or circular housing 47 and the motor 46 preferably are resiliently held by means of springs 48 in order to minimize mechanical noise from the vacuum motor. As shown, the springs 48 and the acoustical housing 38 are mounted onto a shelf 49 contained within the cabinet 11. The acoustical housing 38 may be provided with openings 50 therethrough to facilitate air flow.

In the alternative vacuum nozzle shown in FIGS. 5 and 6, the nozzle 26 contains a channel 51 open at the lower end thereof in front of and in the vicinity of the needle 19, the channel 51 extending obliquely upwardly and sideways from the cartridge 18, as indicated at 52. A hollow nipple 53 extends to the rear of the nozzle 26 at the side 52, to which the vacuum hose 31 is attached. In this embodiment, the cartridge 18 may be attached directly to the underside of the tone arm 15, and the vacuum hose 31 passes alongside the cartridge 18 within the tone arm 15. This nozzle may, if desired, be an integral part of the tone arm 15.

The channel opening at the end of the nozzle 26 near the needle 19 is shaped and oriented so that dust will be sucked from several revolutions of the record groove adjacent to and ahead of the position of the needle 19 as a record 20 is played. That is, the mouth of the nozzle 26, near the needle 19, extends sideways with respect to the needle so as to extend over the revolutions of the record groove that are about to be traversed by the needle. Expressed another way, the nozzle 26 extends sideways of the needle 19 in a direction toward the center of a record 20 being played, if the record is played from the outside to the inside of the groove as is conventional.

It is found that the amount of dust on records and removed from the records by the invention and discharged within the cabinet 11 or acoustic housing 38 is small enough so as not to have deleterious effects. Since the invention removes any dust from records at each playing, the effect is cumulative and the record grooves remain relatively free of dust, thus increasing record life, needle life, and reducing noise effects that would be caused by dust grinding against the needle.

While preferred embodiments of the invention have been shown and described, various other embodiments and modifications thereof will be apparent to those skilled in the art and will fall within the scope of the invention as defined in the following claims.

What we claim is:

1. Apparatus for removing dust from phonograph records of the type having preformed sound grooves therein, comprising a record player turntable having an elongated sound reproducing tone arm mounted in association therewith, said tone arm having a recess formed on the underside thereof, a pick-up cartridge carried in said tone arm recess by said tone arm at the free end thereof, a playback needle carried by said pick-up cartridge, said needle extending downwardly from said cartirdge and being engageable with said preformed record grooves for reproducing sound therefrom, a vacuum nozzle located on said tone arm adjacent the free end thereof, said nozzle being positioned substantially within the recess of said tone arm thereby to provide substantial concealment for said nozzle, said vacuum nozzle being positioned over said cartridge and extending downwardly in front of said cartridge to terminate near said needle and adjacent thereto, a portion of said nozzle extending sideways in front of said cartridge with respect to said needle in a direction so as to apply a vacuum to the groove revolutions of phonograph records ahead of the playing position of the needle, and means to create a vacuum at said nozzle thereby to remove dust from a record as sound is being reproduced therefrom.

2. The apparatus as claimed in claim 1 wherein the turntable and sound reproducing tone arm are carried by a housing, said means to create a vacuum at said nozzle being a vacuum pump positioned in said housing, an acoustical housing capable of absorbing sound positioned over said vacuum pump and in said housing, and a hose connected between said nozzle and said pump, said pump being adapted to discharge the air of said vacuum within said acoustical housing.

3. Apparatus for removing dust from phonograph records of the type having preformed sound grooves therein, comprising a record player turntable having an elongated sound reproducing tone arm mounted in association therewith, said tone arm having a recess formed on the underside thereof, a pick-up cartridge carried in said tone arm recess by said tone arm at the free end thereof, a playback needle carried by said pick-up cartridge, said needle extending downwardly from said cartridge and being engageable with said preformed record grooves for reproducing sound therefrom, a vacuum nozzle located on said tone arm adjacent the free end thereof, said nozzle being positioned substantially within the recess of said tone arm thereby to provide substantial concealment for said nozzle, said vacuum nozzle being positioned over said cartridge and extending downwardly in front of said cartridge to terminate near said needle and adjacent thereto, a portion of said nozzle extending sideways in front of said cartridge with respect to said needle in a transverse direction so as to apply a vacuum to the groove revolutions of phonograph records ahead of the playing position of the needle, the end of said nozzle adjacent said needle being positioned for operative location at approximately one-sixteenth of an inch above a record being played, and means to create a vacuum at said nozzle thereby to remove dust from a record as sound is being reproduced therefrom.

References Cited by the Examiner

UNITED STATES PATENTS

| | | | |
|---|---|---|---|
| 1,227,748 | 5/1917 | Capps et al. | 274—47 |
| 1,544,379 | 6/1925 | Dyer | 274—47 |
| 2,509,307 | 5/1950 | Modera | 274—47 |
| 3,005,223 | 10/1961 | Taylor et al. | 274—47 |

FOREIGN PATENTS

| | | |
|---|---|---|
| 388,023 | 2/1933 | Great Britain. |

NORTON ANSHER, *Primary Examiner.*

C. B. PRICE, *Assistant Examiner.*